(12) United States Patent
Arnold

(10) Patent No.: US 6,672,059 B2
(45) Date of Patent: Jan. 6, 2004

(54) VANE DESIGN FOR USE IN VARIABLE GEOMETRY TURBOCHARGER

(75) Inventor: Steven Don Arnold, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/090,864

(22) Filed: Mar. 4, 2002

(65) Prior Publication Data
US 2002/0187061 A1 Dec. 12, 2002

Related U.S. Application Data

(63) Continuation-in-part of application No. 09/761,277, filed on Jan. 16, 2001, now Pat. No. 6,419,464.

(51) Int. Cl.$^7$ .............................. F02D 23/00; F03B 3/12
(52) U.S. Cl. ................. 60/602; 416/223 R; 416/223 A; 415/164; 415/163
(58) Field of Search ........................... 60/602; 417/407; 415/163, 164; 416/223 R, 223 A, DIG. 2, DIG. 5

(56) References Cited

U.S. PATENT DOCUMENTS

| | | | | |
|---|---|---|---|---|
| 2,392,200 A | * | 1/1946 | Thompson | 415/163 |
| 2,976,013 A | * | 3/1961 | Hunter | 415/163 |
| 3,495,921 A | * | 2/1970 | Swearingen | 415/163 |
| 3,697,193 A | * | 10/1972 | Phillips | 416/223 R |
| 4,242,040 A | * | 12/1980 | Swearingen | 415/163 |
| 4,300,869 A | | 11/1981 | Swearingen | |
| 4,459,083 A | * | 7/1984 | Bingham | 416/223 R |
| 4,657,476 A | * | 4/1987 | Berg | 415/164 |
| 4,668,169 A | * | 5/1987 | Perry | 416/223 R |
| 4,679,984 A | | 7/1987 | Swilhart et al. | 415/163 |
| 4,770,603 A | * | 9/1988 | Engels et al. | 415/164 |
| 4,804,316 A | | 2/1989 | Fleury | 415/164 |
| 5,017,091 A | * | 5/1991 | Tran | 416/223 A |
| 5,035,578 A | * | 7/1991 | Tran | 416/223 A |
| 5,417,548 A | * | 5/1995 | Tangler et al. | 416/223 R |
| 5,562,420 A | * | 10/1996 | Tangler et al. | 416/223 R |
| 6,269,642 B1 | | 8/2001 | Arnold et al. | 60/602 |
| 6,503,058 B1 | * | 1/2003 | Selig et al. | 416/223 R |

FOREIGN PATENT DOCUMENTS

| | | |
|---|---|---|
| EP | 1099838 A1 | 5/2001 |
| JP | 2000291440 | 10/2000 |
| JP | 2001173449 | 2/2001 |

OTHER PUBLICATIONS

Steve Arnold et al., "Advanced Variable Geometry Turubocharger for Diesel Engine Application," Article, Society of Automotive Engineers, Inc., vol. 029 (No. 134), (Aug. 13, 2001).

U.S. patent application Ser. No. 09/761,277, Arnold, filed Mar. 4, 2002.

* cited by examiner

Primary Examiner—Thomas Denion
Assistant Examiner—Thai-Ba Trieu
(74) Attorney, Agent, or Firm—Ephraim Starr; Grant Langton

(57) ABSTRACT

Improved vanes of this invention are constructed for use within a variable geometry turbocharger assembly. Each vane comprises an inner airfoil surface oriented adjacent a turbine wheel, and an outer airfoil surface oriented opposite the inner airfoil surface. The inner and outer airfoil surfaces define a vane airfoil thickness. Each vane includes a leading edge positioned along a first inner and outer airfoil surface junction, a trailing edge positioned along a second inner and outer surface junction, a hole disposed within a first axial vane surface substantially parallel to an outer nozzle wall for receiving a respective post therein, and an actuation tab extending from a second axial vane surface opposite from the first vane surface. A key feature of improved vanes of this invention is that they have an airfoil thickness that is greater than 0.16 times a length of the vane as measured between the vane leading and trailing edges.

17 Claims, 11 Drawing Sheets

VANE DESIGN FOR USE IN VARIABLE GEOMETRY TURBOCHARGER

RELATION TO COPENDING PATENT APPLICATIONS

This patent application is a continuation-in-part of U.S. patent application Ser. No. 09/761,277 filed on Jan. 16, 2001 now U.S. Pat. No. 6,419,464, and is a continuation-in-part of U.S. Provisional Patent Application No. 60/360,727, filed on Mar. 1, 2002, Entitled Improved Vane Variable Nozzle Turbocharger.

FIELD OF INVENTION

This invention relates generally to the field of variable geometry turbochargers and, more particularly, to an improved vane design for vanes for a plurality of pinioning aerodynamic vanes that are disposed within a variable geometry turbocharger for purposes of maximizing flow efficiency within the turbocharger.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft and housed in a compressor housing. Thus, rotary action of the turbine also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

In a turbocharger it is often desirable to control the flow of exhaust gas to the turbine to improve the efficiency or operational range of the turbocharger. Variable geometry turbochargers (VGTs) have been configured to address this need. A type of such VGT is one having a variable exhaust nozzle, referred to as a variable nozzle turbocharger. Different configurations of variable nozzles have been employed in variable nozzle turbochargers to control the exhaust gas flow. One approach taken to achieve exhaust gas flow control in such VGTs involves the use of multiple pivoting vanes that are positioned annularly around the turbine inlet. The pivoting vanes are commonly controlled to alter the throat area of the passages between the vanes, thereby functioning to control the exhaust gas flow into the turbine.

In order to ensure the proper and reliable operation of such VGTs, it is important that the individual vanes be configured and assembled within the turbine housing to move or pivot freely in response to a desired exhaust gas flow control actuation. Because these pivoting vanes are subjected to millions of high temperature cycles during turbocharger operation it is necessary that any such pivoting mechanism be one that is capable of repeatably functioning under such cycled temperature conditions without enduring any cycled temperature related material or mechanical problem or failure.

Known multiple vane VGTs include vanes that are each configured having a shaft projecting outwardly therefrom, each such shafted being positioned within a respective shaft opening in a turbine housing or nozzle wall. While the vanes are commonly actuated to pivot vis-a-vis their shafts within the respective openings, it has been discovered that such vane attachment and pivoting mechanism is not without its problems.

For example, in order to ensure freely pivoting movement of the vane shaft with the opening it is essential that the shaft project perfectly perpendicularly from the vane, to thereby avoid undesired binding or otherwise impairment of the vane pivoting movement. Secondary straightening or machining operations are sometimes necessary to ensure the perpendicularity of the vane shafts, which secondary operations can be both time consuming and costly. Additionally, this type of vane attachment and pivoting mechanism can produce a high cantilevered load on the vane shaft when actuated that can also impair free vane pivoting movement, and that can ultimately result in a vane material or mechanical failure.

An example of such a VGT is one comprising a moveable unison ring disposed within a turbocharger housing of the turbocharger, and a plurality of vanes rotatable disposed within the housing and coupled to the unison ring. The plurality of vanes are interposed within the turbine housing between an exhaust gas inlet and a turbine wheel. The unison ring is operated to rotate the vanes in unison from a closed position (restricting passage of exhaust gas to the turbine wheel) to an open position (enabling passage of exhaust gas to the turbine wheel) for purposes of controlling the turbocharger to perform in a manner that helps to optimizes air flow to the engine. An example of such a VGT is disclosed in U.S. Pat. No. 6,269,642, which is incorporated herein by reference.

Vanes used in such known VGTs are characterized as having a "slim" aerodynamic vane shape, i.e., having a thin airfoil or radial thickness (that is defined at its thickest region between a vane outer surface and a vane inner surface). Generally speaking a conventional vane has an airfoil thickness that is less than about 0.14, and that can be in the range of from about 0.05 to 0.14 the length of the vane (as measured between vane leading and trailing edges). While such conventional slim or thin airfoil vanes are useful for providing peak aerodynamic efficiency in a VGT, this particular vane design limits the flow turndown ratio and turbine efficiency throughout the range of motion for the vanes within the turbocharger.

It is, therefore, desirable that a vane pivoting mechanism be constructed, for use with a variable nozzle turbocharger, in a manner that provides improved vane operational reliability when compared to conventional vane pivoting mechanisms. It is also desired that an improved vane configuration be constructed that provides a throat area that is similar or better than that of the conventional slim airfoil vane configuration, while at the same time provide a throat area turndown ratio that is improved, and an improved turbine efficiency throughout the range of vane movement, when compared to the conventional slim airfoil vane configuration.

SUMMARY OF THE INVENTION

Improved vanes of this invention are constructed for use within a VGT. The VGT comprises a turbine housing having an exhaust gas inlet and an outlet, a volute connected to the inlet, and a nozzle wall adjacent the volute. A turbine wheel is carried within the turbine housing and is attached to a shaft. A plurality of such improved vanes are disposed within the turbine housing between the exhaust gas inlet and turbine wheel.

Each improved vane comprises an inner airfoil surface oriented adjacent the turbine wheel, And an outer airfoil surface oriented opposite the inner airfoil surface. The inner and outer airfoil surfaces define a vane airfoil thickness. A vane leading edge or nose is positioned along a first inner and outer airfoil surface junction, and a vane trailing edge positioned along a second inner and outer surface junction. Each vane includes a hole disposed within a first axial vane surface substantially parallel to outer nozzle wall for receiving a respective post therein that projects outwardly from the nozzle wall. Each vane also includes an actuation tab that extends from a second axial vane surface opposite from the first vane surface.

A key feature of improved vanes of this invention is that they have an airfoil thickness that is greater than conventional "slim" vanes. In an example embodiment, improved vanes of this invention have an airfoil thickness that is greater than about 0.16 times a length of the vane as measured between the vane leading and trailing edges. Additionally, an embodiment of the improved vane of this invention can have a complex shaped inner surface comprising a convex portion adjacent the vane leading edge, and a concave portion adjacent the vane trailing edge.

BRIEF DESCRIPTION OF THE DRAWINGS

The invention will be more clearly understood with reference to the following drawings wherein.

DETAILED DESCRIPTION OF THE INVENTION

The invention, constructed in accordance with the principles of this invention, comprises a improved vane for use in a VGT that is configured having a stemless design, and having a modified airfoil profile and thickness for purposes of minimizing unwanted aerodynamic effects and improving operating efficiency, e.g., providing improved throat area turn down, when compared to conventional "slim" airfoil thickness vanes.

A VGT generally comprises a center housing having a turbine housing attached at one end, and a compressor housing attached at an opposite end. A shaft is rotatably disposed within a bearing assembly contained within the center housing. A turbine or turbine wheel is attached to one shaft end and is disposed within the turbine housing, and a compressor impeller is attached to an opposite shaft end and is disposed within the compressor housing. The turbine and compressor housings are attached to the center housing by bolts that extend between the adjacent housings.

Figure 1:
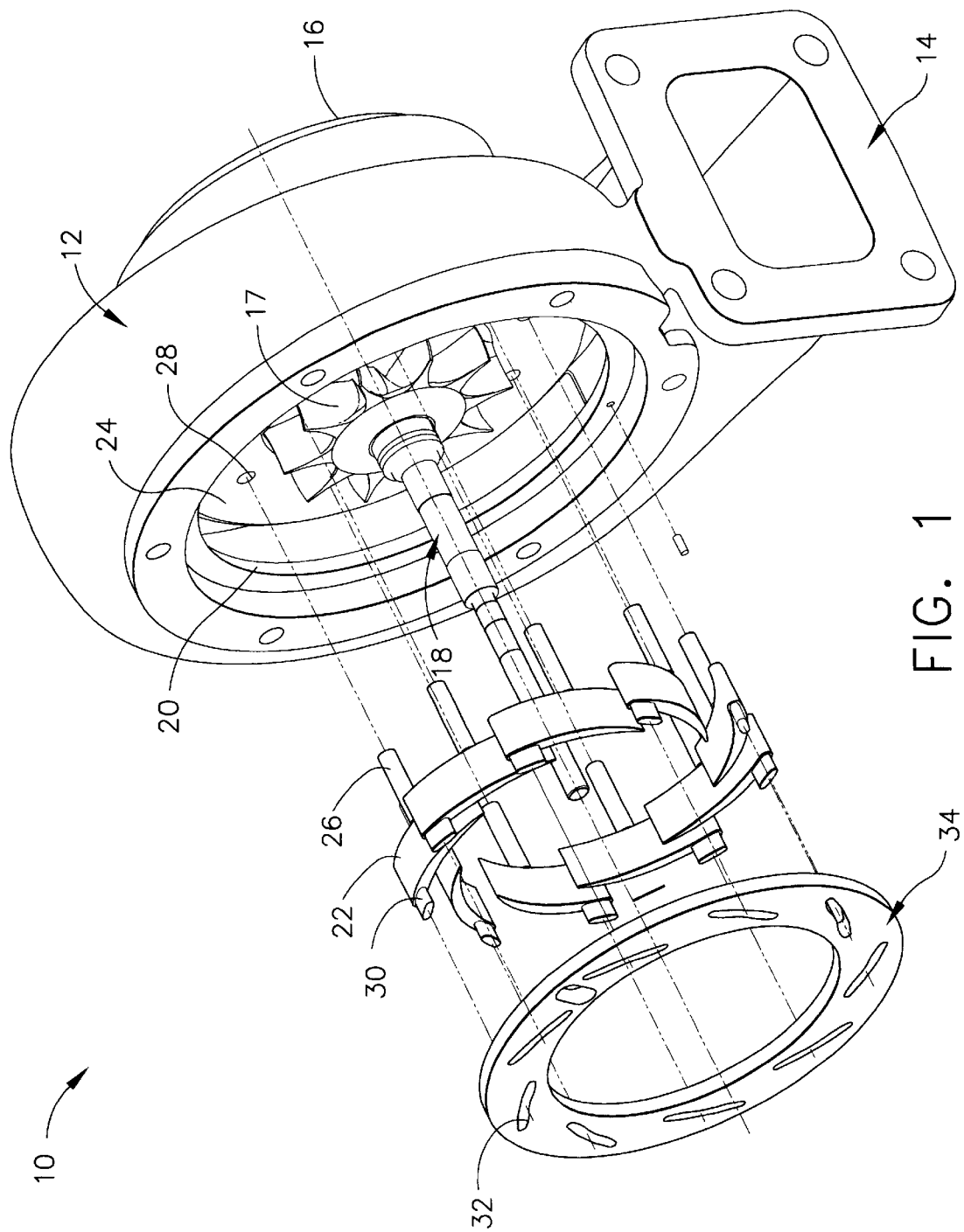
FIG. 1 is an exploded isometric view of a turbine housing for a variable geometry turbocharger employing conventional vanes.

FIG. 1 illustrates a portion of a known VGT 10 comprising a turbine housing 12 having a standard inlet 14 for receiving an exhaust gas stream, and an outlet 16 for directing exhaust gas to the exhaust system of the engine. A volute is connected to the exhaust inlet and an integral outer nozzle wall is incorporated in the turbine housing casting adjacent the volute. A turbine wheel 17 and shaft assembly 18 is carried within the turbine housing 12. Exhaust gas, or other high energy gas supplying the turbocharger, enters the turbine housing through the inlet 14 and is distributed through the volute in the turbine housing for substantially radial delivery to the turbine wheel through a circumferential nozzle entry 20.

Multiple vanes 22 are mounted to a nozzle wall 24 machined into the turbine housing using shafts 26 that project perpendicularly outwardly from the vanes. The vanes conventionally used in such a VGT are slim airfoil thickness design mentioned above. The shafts 26 are rotationally engaged within respective openings 28 in the nozzle wall. The vanes each include actuation tabs 30 that project from a side opposite the shafts and that are engaged by respective slots 32 in a unison ring 34, which acts as a second nozzle wall.

An actuator assembly (not shown) is connected with the unison ring 34 and is configured to rotate the ring in one directed or the other as necessary to move the vanes radially outwardly or inwardly to respectively increase or decrease the amount of exhaust gas flow to the turbine. As the unison ring is rotated, the vane tabs 30 are caused to move within their respective slot 32 from one slot end to an opposite slot end. Since the slots are oriented radially along the unison ring, the movement of the vane tabs 30 within the respective slots 32 causes the vanes to pivot via rotation of the vane shafts within their respective openings and move radially outwardly or inwardly depending on the unison ring rotational direction. Examples of known VGTs comprising such elements are disclosed in U.S. Pat. Nos. 4,679,984; 4,804, 316; and 6,269,642 which are each incorporated herein by reference.

Figure 2:
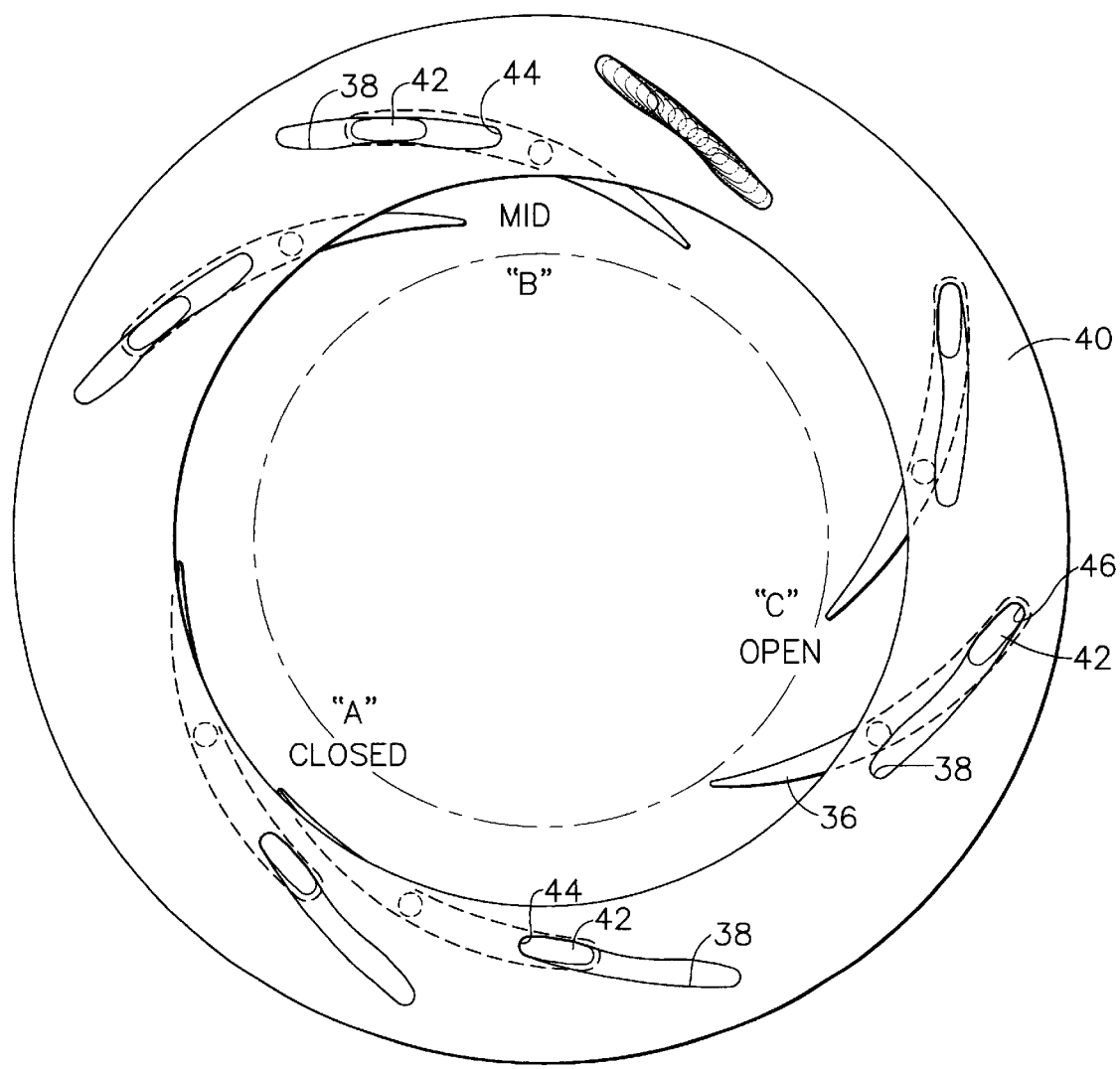
FIG. 2 is a top view of a unison ring with slots showing engagement with tabs of stemless slim vanes in different vane operating positions.

FIG. 2 illustrates the general movement pattern of conventional slim vanes 36, as used in the VGT described and illustrated above, when actuated by the unison ring. This movement pattern however, is generally the same for both the known slim vane configurations and the improved vane design prepared according to principles of this invention as used with VGTs. Each vane tab 42 is disposed within a respective elongated slot 38 of a unison ring 40. In a closed position "A", the vane tab 42 is positioned adjacent a first end 44 of the slot 38. This position is referred to as a closed position because the vane is not flared radially outward, thereby serving to limit the flow of exhaust gas to the turbine. At an intermediate position "B" the unison ring 40 has been rotated a sufficient amount such that the vane tab 42 is moved within the slot 38 away from the first slot end 44 towards a middle position of the slot. The vane tab movement is provided by the pivoting action of the vane relative to the nozzle wall, allowing the vane to be rotated radially outwardly a given extent. At position "B" the intermediate radial projection of the vane serves to increase the flow of exhaust gas to the turbine when compared to closed position "A". At position "C" the unison ring has now been rotated to a maximum position, causing the vane tab 42 to be moved within the slot 38 to a second end 46. Again, such further vane movement is facilitated by the pivoting arrangement between the vane and the nozzle wall, allowing the vane to be rotated radially outwardly to a maximum position. At position "C" the maximum radial projection of the vane serves to increase the flow of exhaust gas to the turbine when compared to the intermediate position "A".

As mentioned above in the background, proper operation of known VGTs, comprising the plurality of movable vanes as described above and illustrated in FIG. 1, requires that the vanes be permitted to pivot freely vis-a-vis the nozzle wall when actuated by the unison ring. Such free pivoting movement requires that the vane shafts not bind or otherwise be restricted in their rotational movement within their respective nozzle holes. The known vane design can produce impairments to free pivoting vane movement if the shaft projecting from each vane is not perfectly perpendicular. Additionally, the known vane design can produce an impairment to free pivoting vane movement by the relatively high cantilever load stress imposed on the vane by virtue of the vane shaft and hole attachment mechanism.

Figure 3:
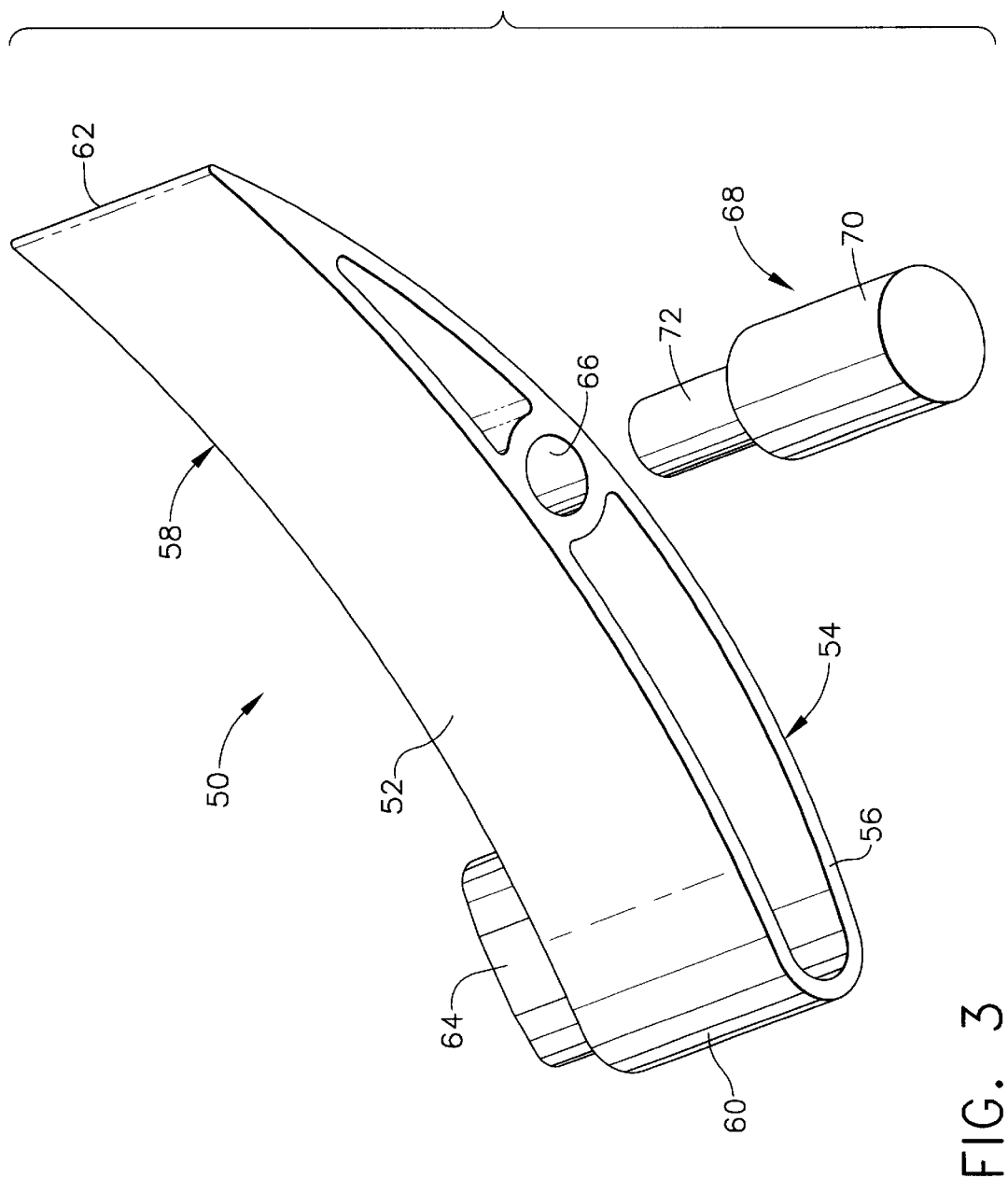
FIG. 3 is a detailed view of the stemless slim vane of FIG. 2.

FIG. 3 illustrates a "shaftless" or "stemless" vane 50 of this invention for use with a VGT comprising an inner radial surface 52, an opposite outer radial surface 54, and axial surfaces 56 and 58. These vane surfaces are defined relative to the vane placement within the turbine housing. The vane 50 includes a leading edge or nose 60 and a trailing edge 62 at opposite common ends of the inner and outer radial surface 52 and 54. As used herein, the term leading edge is used to refer to a rounded nose portion of the vane, and is not intended to a sharp or abrubtly angled surface feature. The vane includes a tab 64 projecting outwardly away from the axial surface 58 and positioned adjacent the leading edge 60, which tab is configured to cooperate with a unison ring slot in the manner described above to facilitate vane actuation.

Unlike the known vane design described above and illustrated in FIGS. 1 and 2, vane 50 does not include a shaft. Rather, the vanes of this invention are designed having a hole 64 disposed within the axial surface 56 that is sized and configured to accommodate placement of a respective post 68 therein (see FIG. 3), wherein the post projects perpendicularly outwardly away from the turbine housing nozzle wall. Configured in this manner, vane pivoting movement vis-a-vis the nozzle wall is provided by the relative rotational motion between the fixed post and the hole in the vane. The pivoting mechanism provided by the fixed wall post disposed in the rotatable vane hole reduces the amount of cantilever load stress on the vane, when compared to known vane designs and attachment mechanisms, thereby serving to reduce and/or eliminate potential impairments to efficient vane movement and operation.

Each post 68 can be configured to be attached to the nozzle wall by pressed fit or other conventional attachment method, and is positioned within the nozzle wall in a substantially circular pattern the coincides with the desired spaced apart vane arrangement. In an example embodiment, the post 68 is configured having a stepped design with two different diameters, wherein a first enlarged diameter section 70 is sized and configured to provide a secure pressed fit attachment within the nozzle wall, and wherein a second reduced diameter section 72 is sized and configured to project outwardly from the nozzle wall and fit within the vane hole 66 to provide rotational movement therewith. However, as better described below, with other vane embodiments of this invention the post can be of a uniform diameter, i.e., be of a non-stepped design.

The vane 50 is configured having a relatively slim airfoil thickness, as measured between the inner and outer radial surfaces 52 and 54. For example, in one embodiment where the vane length is approximately 52 mm (as measured along a straight line between the vane leading edge and the vane trailing edge), the airfoil thickness was approximately 5 mm, or less than 0.1 times the length. In example embodiments, the airfoil thickness for such slim vane design is less than about 0.14 times the length of the vane, e.g., in the range of from about 0.05 to 0.14 the length of the vane.

The relatively thin airfoil thickness for the vane 50 is a result of the relatively gradually curved airfoil outer and inner vane surfaces 54 and 52. The vane 50 is characterized as having a continuous convex-shaped outer surface defined by a relatively large radius of curvature, and a continuous concave-shaped inner surface defined by a similarly large radius of curvature. The vane outer surface 54 radius of curvature for such slim vane design can be greater than about 0.8 times the length of the vane, e.g., can be in the range of from about 0.8 to 1.5 the length of the vane. The vane inner surface 52 radius of curvature for such slim vane design can be greater than 1 times the length of the vane, e.g., in the range of from about 1 to 1.8 the length of the vane. For example, in one embodiment where the vane length is approximately 52 mm, the vane outer surface 54 has a radius of curvature that is approximately 57 mm, and the vane inner surface 52 has a radius of curvature of 68 mm. Additionally, the vane leading edge 60 of such vane 50 has an abruptly rounded shape that is defined by a relatively small radius.

Figure 4:
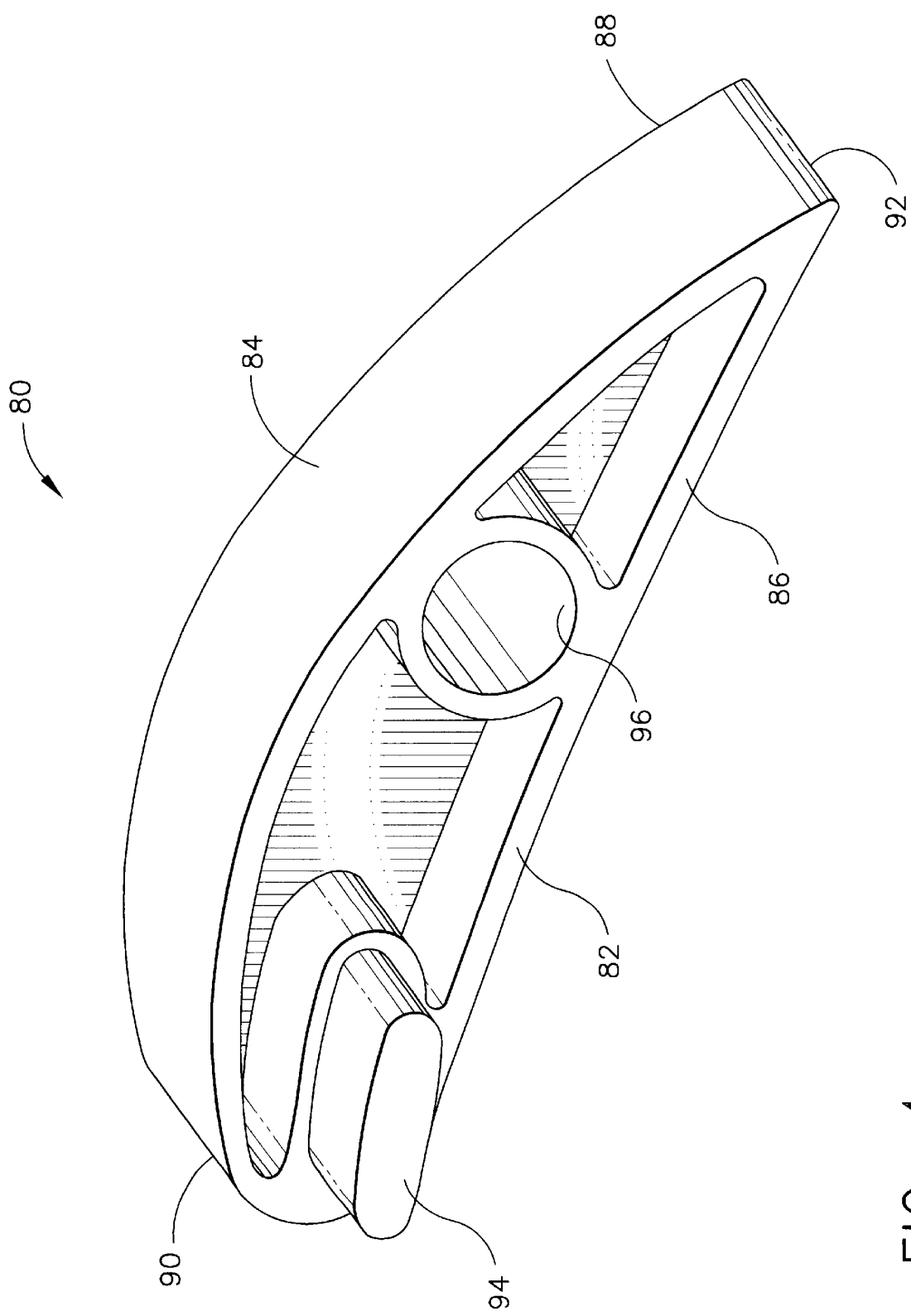
FIG. 4 is a detailed view of an improved vane constructed according to principles of this invention.

FIG. 4 illustrates a first embodiment improved vane 80 of this invention comprising, like vane 50 described above and illustrated in FIG. 3, an inner radial surface 82, an opposite outer radial surface 84, axial surfaces 86 and 88, leading edge or nose 90, trailing edge 92, actuating tab 94, and post hole 96. Vane 80 is generally configured in the same manner as vane 50 to cooperate with the unison ring and turbine housing and be rotated within the turbine housing to control exhaust gas flow to the turbine wheel.

Unlike the slim vane 50, the improved vane 80 is has an airfoil profile and an airfoil thickness that is different from that of the slim vane. The improved vane of this invention includes an outer surface 84 having an increased degree of radial curvature, i.e., a reduced radius of curvature, when compared to a conventional slim airfoil thickness vane. The reduced radius of curvature provides an outer airfoil profile having an exaggerated curve when compared to the relatively gradually curved outside surface of the conventional slim vane. This reduced radius of curvature also operates to increase the radial or airfoil thickness of the vane.

In an example first embodiment, an improved vane of this invention can have an airfoil or radial thickness that can be greater than about 0.16 the length of the vane, e.g., in the range of from about 0.16 to 0.50 the length of the vane (as measured by a straight line between the vane leading and trailing edges). In one example, where the vane length is approximately 47 mm, the airfoil thickness is approximately 12 or 0.25 times the vane length. It is to be understood, that the exact airfoil thickness of improved vanes of this invention can and will vary within this general range depending on the particular VGT and engine application.

As mentioned above, the first embodiment improved vane 80 of this invention comprises a an outer airfoil surface 84 having a relatively small radius of curvature. In an example first embodiment, an improved vane of this invention can have an airfoil outer surface defined by a radius of curvature that is less than about 0.8 times the vane length, e.g., from about 0.1 to 0.8 times the vane length. The first embodiment improved vane 80 has an inner airfoil surface 82 that is almost linear in appearance, having a convex surface defined by a relatively large radius of curvature. In an example first embodiment, the improved vane can have an airfoil inner surface defined by a radius of curvature that is greater than about 2 times the vane length. For example, in one embodiment where the vane length is approximately 47 mm, the vane outer surface 84 has a radius of curvature that is approximately 28 mm, and the vane inner surface 82 has a radius of curvature of approximately 207 mm.

Additionally, the improved vane 80 of this invention has a leading edge 90 that is characterized by a relatively large radius of curvature when contrasted with the conventional slim airfoil vane for purposes of minimizing the incidence effects through the flow range of the vane.

Figure 5A:
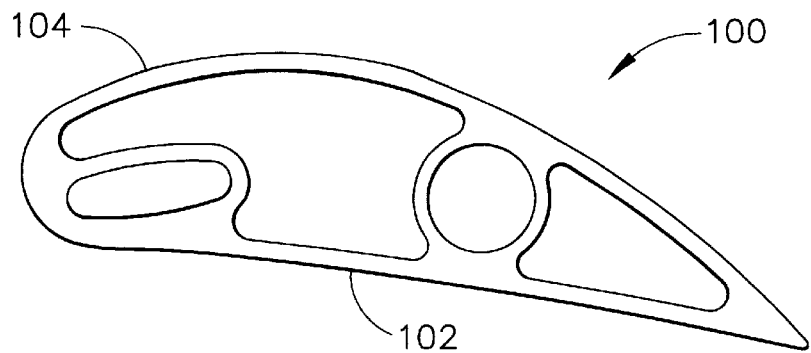
FIGS. 5A to 5C are elevational side views of different improved vane designs of this invention.
Figure 5B:
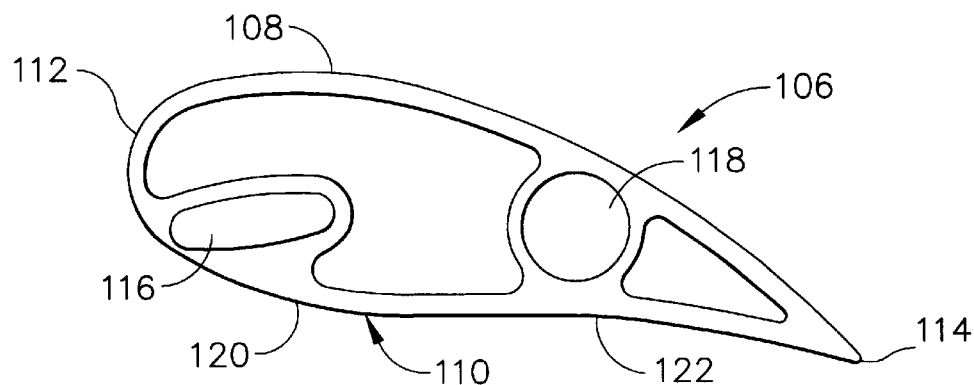
Figure 5C:
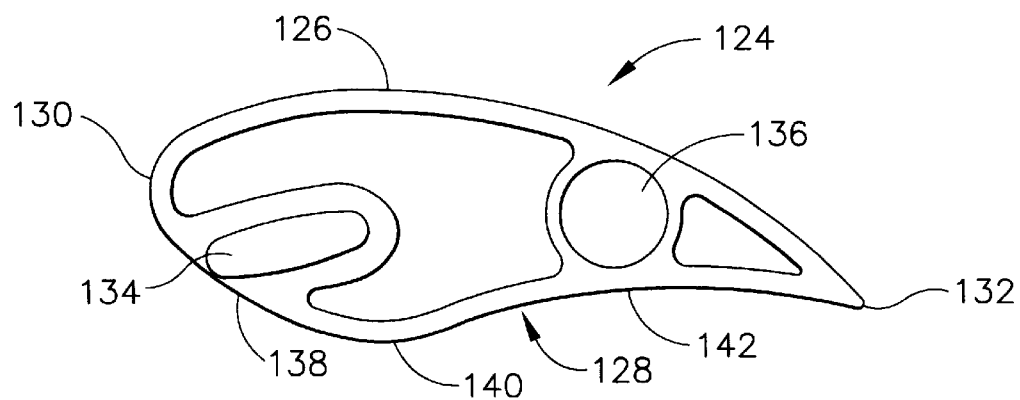

FIGS. 5A to 5C illustrate the first embodiment vane of this invention (as shown in FIG. 4) as compared with two other improved vane embodiments of this invention. FIG. 5A shows the first embodiment improved vane 100 of this invention as characterized by the relatively large airfoil thickness, between inner and outer surfaces 102 and 104, and by the generally continuous small radius curved outer surface 104 and generally continuous large radius curved inner surface 102.

FIG. 5B illustrates a second embodiment improved vane 106 of this invention, comprising an outer surface 108, an inner surface 110, a leading edge 112, a trailing edge 114, an actuation tab 116, and a post hole 118. The second embodiment vane comprises a leading edge and inner surface that are each shaped differently from that of the first embodiment. Specifically, the leading edge 112 is characterized by having a larger radius of curvature such that an adjacent portion of its outer surface 108 is located greater distance from the actuation tab 116, thereby increasing the airfoil thickness of the vane adjacent the leading edge. An example second vane embodiment has a leading edge 112 that can be defined by a radius of curvature that is at least about 1.1 times that of the leading edge for the first embodiment vane, e.g., in the range of from about 1.1 to 1.8 times that of the first embodiment improved vane.

Additionally, rather than having a continuous convex shape (i.e., defined by a single radius of curvature), the inner surface 110 has a complex shape that is defined by at least two differently shaped sections. Moving from the leading edge 112, the inner surface has a convex-shaped portion 120 that is defined by a radius of curvature that is greater than that of the leading edge to contour or blend the leading edge into the inner surface. The convex-shaped portion 120 extends from the leading edge 116 to just past the tab 116. Moving from the convex-shaped portion 102, the inner surface has a concave-shaped portion 122 that extends to the vane trailing edge 122.

The enlarged and upwardly oriented leading edge and complex-shaped of the inner surface of this second vane embodiment operate to provide additional aerodynamic effects when compared to the first embodiment improved vane. The vane creates a complex pressure field entering the vanes system, passing through and exiting the vane system. The integration of the surface pressure times it's distance to the pivot point around the entire vane results in a net torque on the vane. This torque must be reacted by the vane tab and actuation system and is a key factor in actuation force sizing and also is a significant influence in the wear of the vane mechanism. The pressure field varies significantly throughout the vane operating range. Detailed investigation of this phenomena shows that high vane closure forces can be generated when the vanes are in the more closed position, as there is a significant acceleration of the flow and resulting drop in pressure through the vane. By tailoring the convergence of the passage, the rate at which the flow accelerates through the passage can be controlled thus giving one the ability to control the pressure and thus the net torque on the vane. Controlling the net torque on the vane allows one to minimize the forces in the vanes system resulting in reduced wear, and a smaller actuation system.

The complex and contoured shape of the inner surface 110 operates to increase the flow passage of exhaust gas along the vane prior to entering the throat area. Additionally, the specially contoured shape of the inner surface 110 affects the net torque on the vane in that it provides net torque in the opposite direction.

Together, the second vane embodiment leading edge and inner surface operate to reduce the amount of pressure loss through the vanes during operation because the exhaust gas passing between the vanes passes as converging passage instead of parallel passage, thereby significantly reducing exhaust gas velocities upstream of the throat, which result in lower gas friction losses through the vane passage.

FIG. 5C illustrates a third embodiment improved vane 124 of this invention, comprising an outer surface 126, an inner surface 128, a leading edge 130, a trailing edge 132, an actuation tab 134, and a post hole 136. Like the second vane embodiment, the third embodiment vane also comprises a leading edge and inner surface that are shaped differently from that of the first embodiment. Specifically, the leading edge 130 is characterized by having a somewhat smaller radius of curvature, and the inner surface comprises a complex shaped that can be characterized by three differently shaped sections.

Rather than being defined by a continuous convex arc (i.e., defined by a single radius of curvature), the inner surface 128 has a complex shape that is defined by at least three differently shaped sections. Moving from the leading edge 130, the inner surface has a downwardly canted generally planar section 138 that extends away from the vane leading edge adjacent the tab 134 at an angle of approximately 45 degrees. The canted section 138 extends for less than about ¼ the total distance along the inner surface and is transitioned to a convex section 140. The convex section is defined by a radius of curvature that is generally less than that used to define the arc of the outer surface 126. The convex section 140 extends along the inner surface to about the mid point of the vane and defines a point of maximum airfoil thickness for the vane. Thus, the third embodiment vane has a airfoil thickness that is greater than both the first and second vane embodiments.

Together, the canted section 138 and the convex section give an upstream portion of the vane a decidedly downward projection, when compared with either the first or second improved vane embodiments. This design provides aerodynamic improvements that are similar to that of the second vane embodiment, only slightly more pronounced, such as increased efficiency due to reduced pressure drop across the vane. Features of this particular design were to make the converging passage more pronounced, magnifying the previously noted effect, and shift the flow toward more radial entry, where the optimum flow angle occurred at a more closed vane position.

Figure 6:
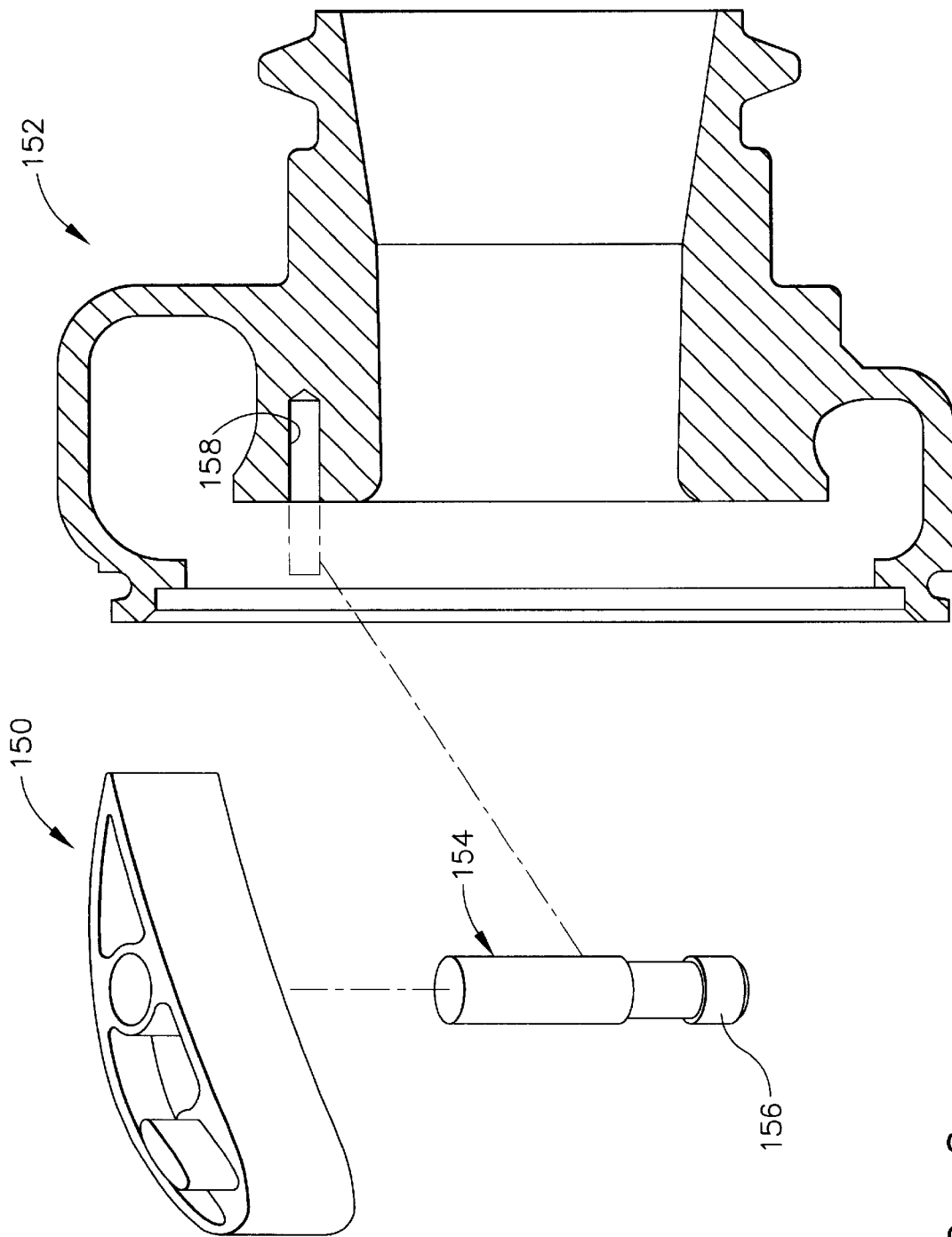
FIG. 6 is a exploded schematic view of the improved vane of this invention as fitted into a turbocharger housing.

FIG. 6 illustrates placement of an improved vane 150, constructed in accordance with principles of this invention, within a VGT turbine housing 152 by use of an appropriately sized and shaped post 154. Although a stepped post was described and illustrated above for use with the slim vane of FIG. 3, the first, second, and third improved vane embodiments disclosed above are constructed to be pivotably attached to the turbine housing by a single diameter post. The post 154 illustrated in FIG. 6 includes a barbed head 156 for purposes of providing a permanently pressed fit into a hole 158 formed in the turbine housing. So attached, the improved vanes of this invention are assembled, installed, and operate within the VGT in the manner described above.

Figure 7:
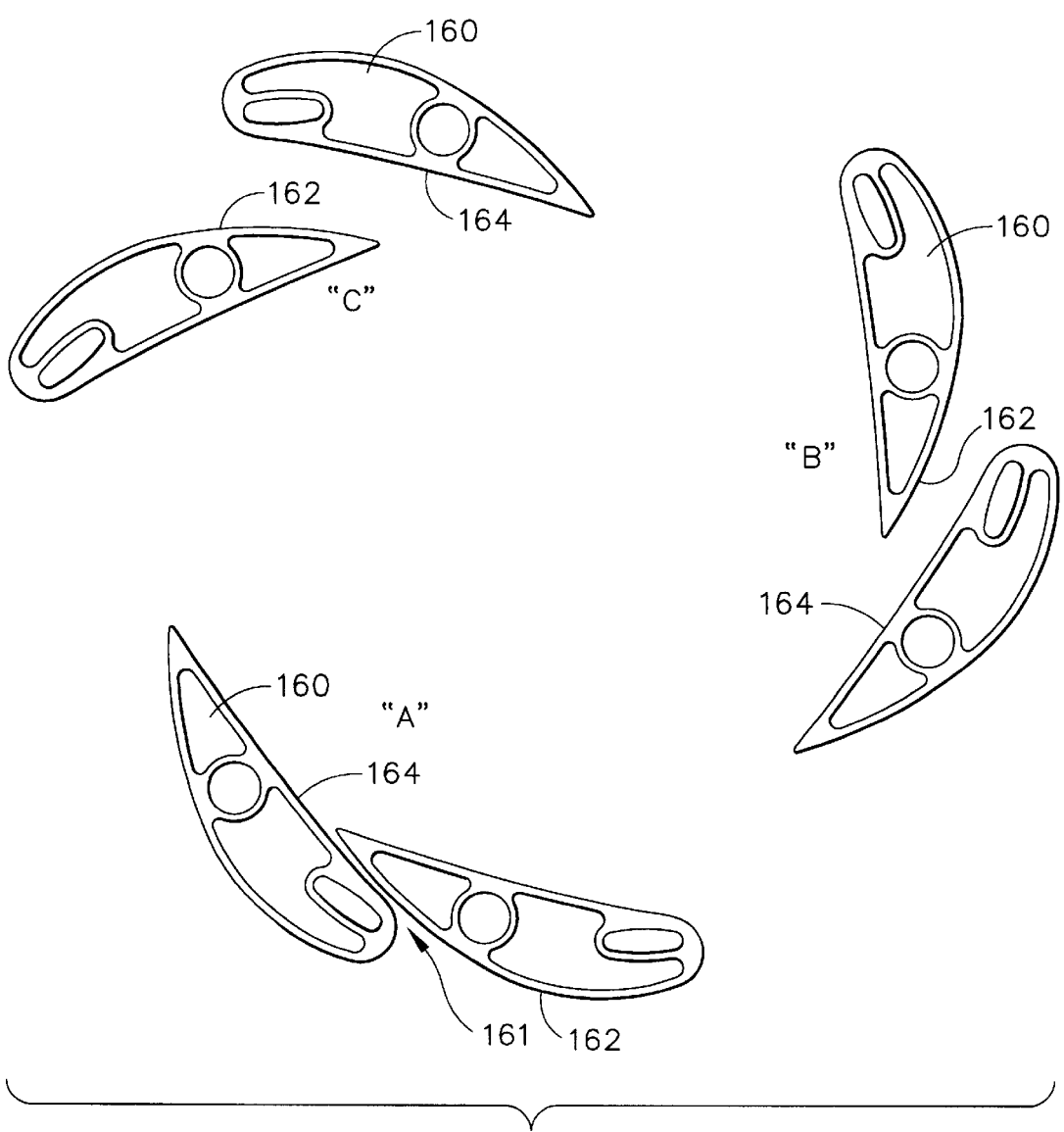
FIG. 7 is a top view of first embodiment improved vanes of this invention in different vane operating positions.

FIG. 7 illustrates the movement pattern of first embodiment improved vanes 160 of this invention illustrated in FIGS. 4 and 5A, when placed in the VGT and actuated by the unison ring described and illustrated above. For purposes of illustrating how the vanes relate to one another in the VGT, a pair of adjacent vanes are provided for each different operating position. In a closed position "A", the vanes are operated by the unison ring (by tab in slot cooperation) to position each vane leading edge radially inward toward the turbine wheel, thereby serving to close off and limit the flow of exhaust gas through the vanes and to the turbine. At an intermediate position "B" the unison is rotated a sufficient amount to move the vane leading edge radially outwardly, thereby enabling the vanes to increase the flow of exhaust gas to the turbine when compared to closed position "A". At position "C" the unison ring is rotated to a maximum position, causing the vanes 160 to be pivoted radially outwardly to a maximum position, thereby providing a maximum flow of exhaust gas to the turbine when compared to the intermediate position "A".

In the closed position "A" one can see that the exhaust flow passageway 161 between the adjacent vanes is defined by opposed substantially parallel surfaces consisting of the vane outer and inner airfoil surfaces 162 and 164. As noted above, this parallel gas passage leads to a large pressure loss within the turbine housing. A pressure loss through the vanes reduces the pressure differential potential of the turbine, thus lowering the efficiency.

Figure 8:
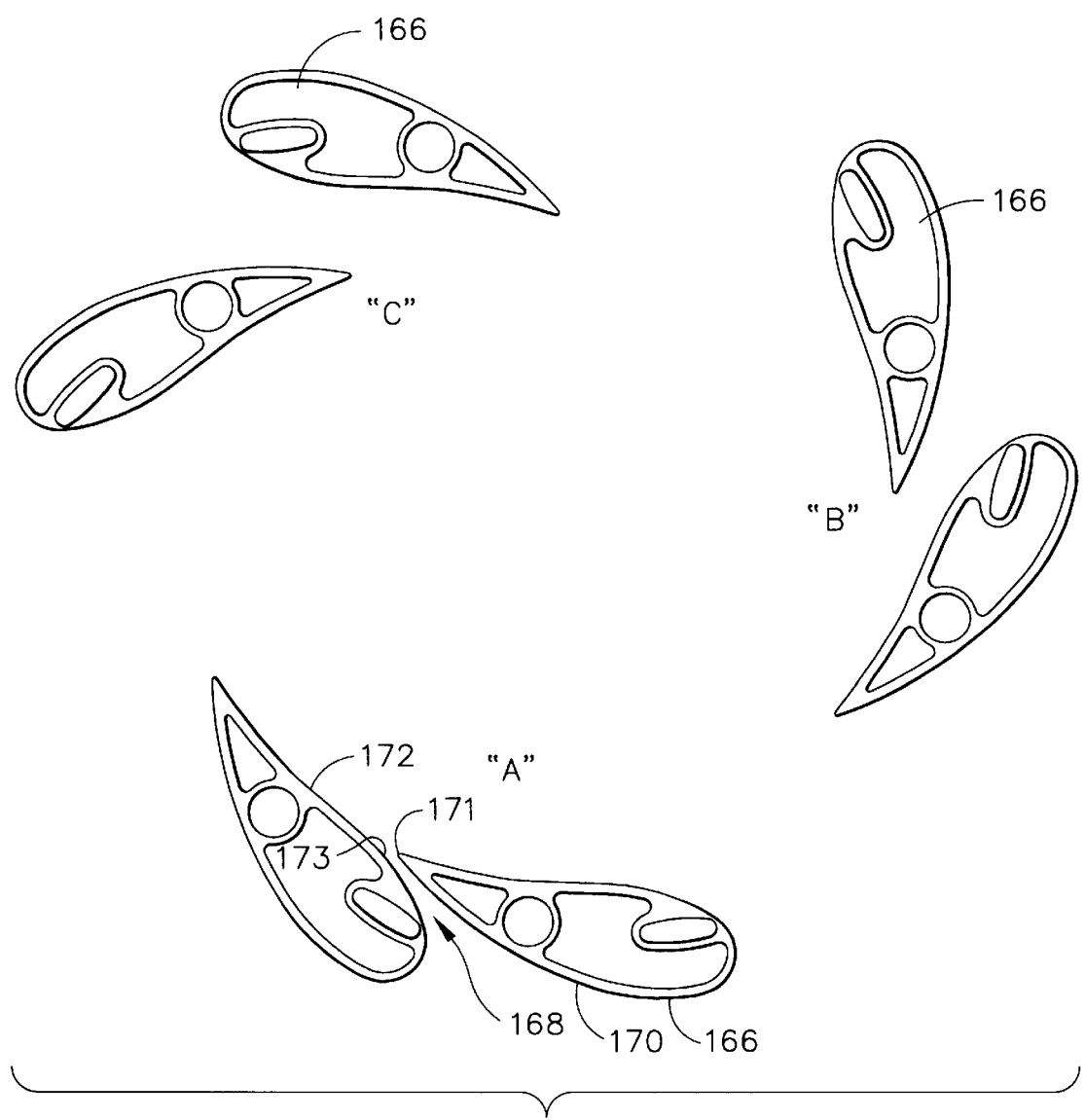
FIG. 8 is a top view of second embodiment improved vanes of this invention in different vane operating positions.

FIG. 8 illustrates the movement pattern of second embodiment improved vanes 166 of this invention illustrated in FIG. 5B, when placed in the VGT and actuated by the unison ring described and illustrated above. The second embodiment improved vane is operated in the same manner described above for the first improved vane embodiment. A key feature of the second improved vane embodiment is that (unlike the first vane embodiment), when placed in a closed position "A", one can see that the exhaust flow passageway 168 between adjacent vanes is defined by opposed converging surfaces formed by the vane outer and inner airfoil surfaces 170 and 172.

Specifically, when placed into closed position "A", the trailing edge 171 of one vane is positioned next to the inner surface convex portion 173 of an adjacent vanes to close off exhaust gas flow. As noted above, this converging gas passage leads to a reduced pressure loss within the turbine housing when compared to the first embodiment improved vane.

Figure 9:
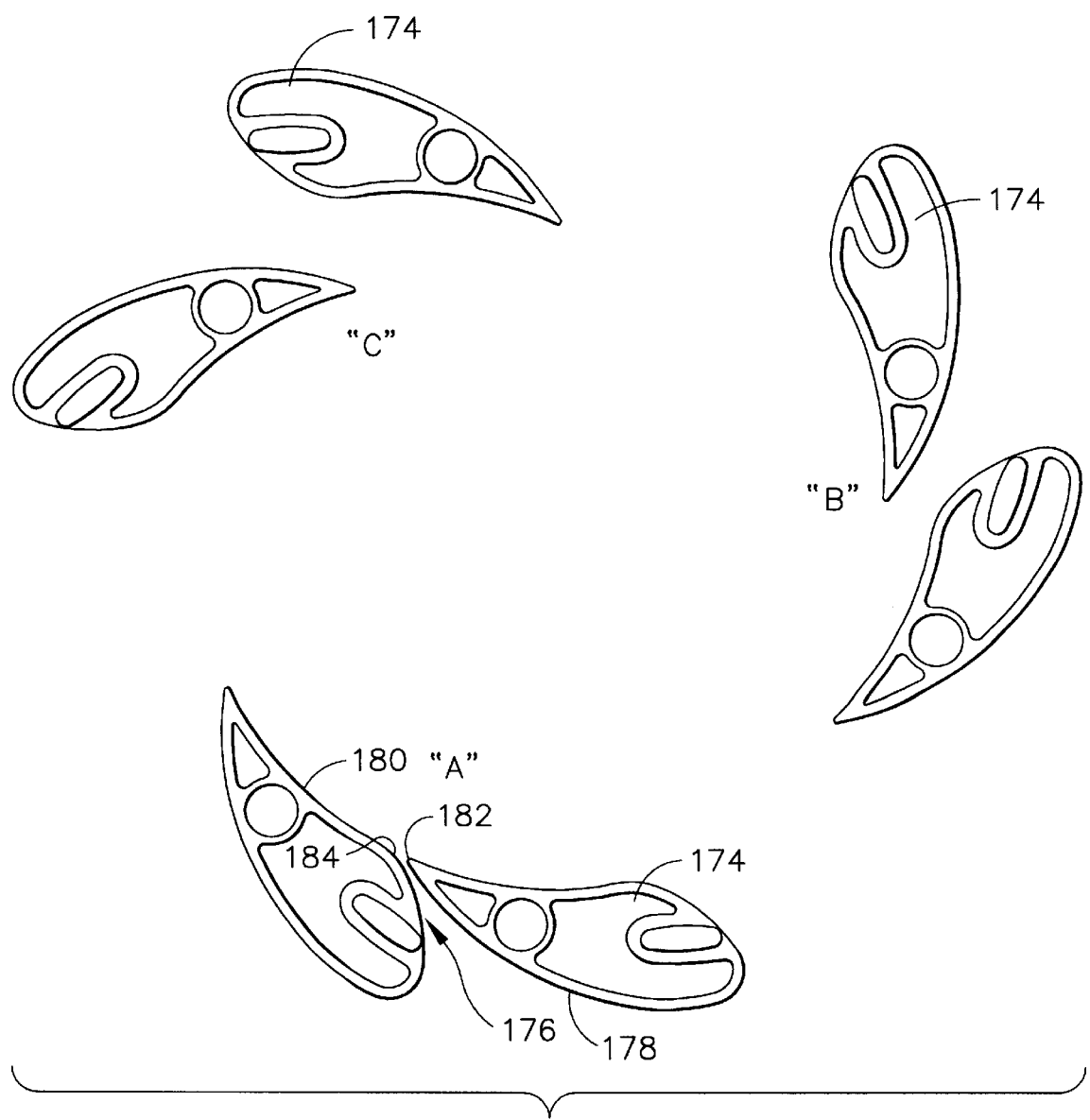
FIG. 9 is a top view of third embodiment improved vanes of this invention in different vane operating positions.

FIG. 9 illustrates the movement pattern of third embodiment improved vanes 174 of this invention illustrated in FIG. 5C, when placed in the VGT and actuated by the unison ring described and illustrated above. The third embodiment improved vane is operated in the same manner described above for the first and second improved vane embodiments. Like the second vane embodiment, the third improved vane embodiment (when placed in a closed position "A") provides an exhaust flow passageway 176 between adjacent vanes defined by opposed converging surfaces formed by the vane outer and inner airfoil surfaces 178 and 180.

Specifically, when placed into closed position "A", the trailing edge 182 of one vane is positioned next to the inner surface convex portion 184 of an adjacent vanes to close off exhaust gas flow. As noted above, this converging gas passage leads to a reduced pressure loss within the turbine housing when compared to the first embodiment improved vane.

Generally the improved vane design of this invention utilizes the blockage effect of an extremely thick airfoil to create a higher area turndown for a fixed amount of vane rotation. The increased thickness of an airfoil in a cascade has a much higher impact on throat area in the "vanes closed" position than it does in the "vanes open" position. By significantly increasing the thickness of the vane, and slightly increasing the axial width of the vane, the same maximum throat area is achieved.

As the vanes rotate closed, the throat area reduces at a higher rate. The additional benefit of this is that for a fixed area turndown, less rotation of the vane is required. Reduced rotation of the vanes results in less deviation from the optimum flow vector (around 70 degrees from radial), thus improving off-design efficiency.

Figure 10:
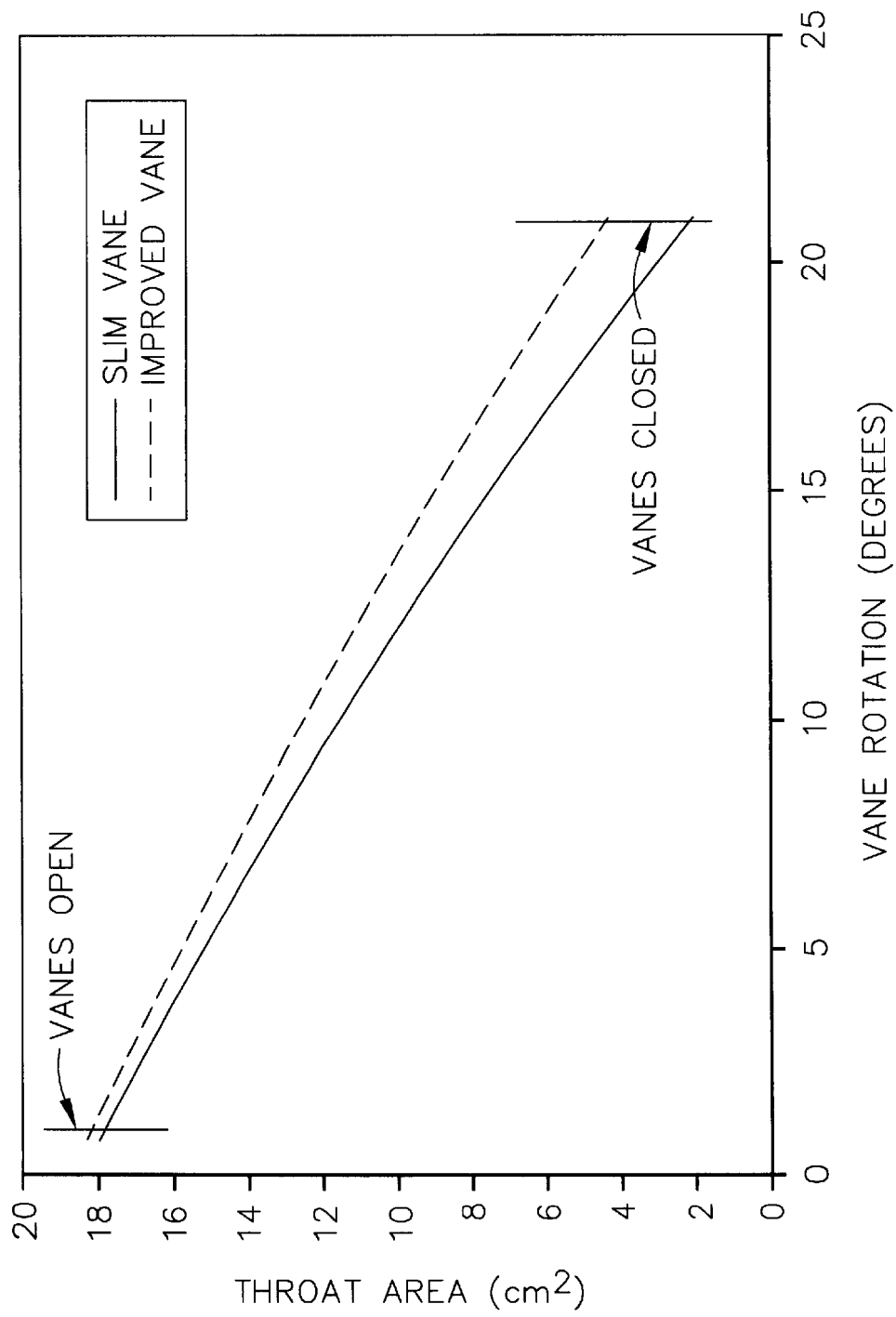
FIG. 10 is a graph illustrating comparative throat area v. vane rotation data for the conventional slim vane v. the improved vane design of this invention.

FIG. 10 graphically illustrates the change in throat area as a function of vane rotation for each of the slim vanes and the improved vanes of this invention. The graph shows that for a given vane rotation, of from about 1.5 degrees to 20 degrees, the improved vane design of this invention provides a greater amount of throat area than that of the conventional slim vane design. The throat area turndown ratio (maximum area divided by the minimum area) is increased from 4.3 for the slim vane to 8.7 for the improved vane design of this invention. This is shown for 20 degrees of vane rotation.

Figure 11:
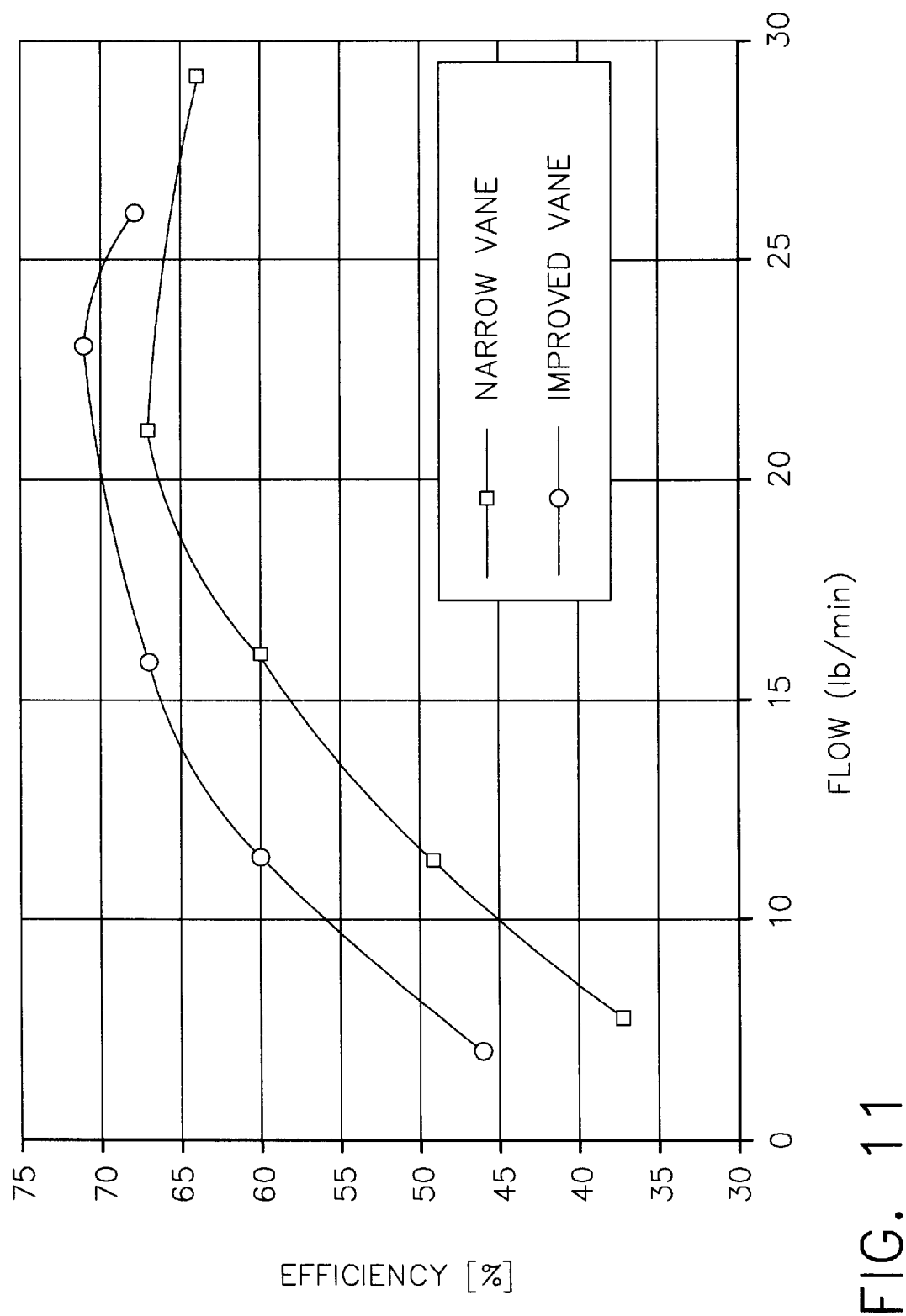
FIG. 11 is a graph illustrating efficiency v. flow data for the conventional slim vane v. the improved vane design of this invention.

FIG. 11 graphically illustrates the difference in efficiency as a function of flow for each of the slim vanes and the improved vanes of this invention. The graph shows that for a given flow the improved vanes of this invention provide a greater efficiency than the slim vanes. Although the maximum flow that can be achieved using the improved vanes of this invention is lower than that of the slim vanes, the efficiency is higher and broader. Additionally, the flow curve for the improved vanes is shifted to lower flow values, indicating greater operating efficiency at lower engine operating conditions.

Improved vanes of this invention can be formed from the same types of materials, and in the same manner, as that used to form conventional prior art vanes. The vanes can have a substantially sold design or can be configured having a cored out design. In an example embodiment, the improved vanes of this invention are configured having cored out axial surfaces. The cored out design is preferred as it has been found to provide better formability, a higher level of stiffness, be more cost effective to produce, and have a reduced mass when compared to conventional prior art vanes.

Having now described the invention in detail as required by the patent statutes, those skilled in the art will recognize modifications and substitutions to the specific embodiments disclosed herein. Such modifications are within the scope and intent of the present invention.

What is claimed is:

1. A variable geometry turbocharger assembly comprising:
   a turbine housing having an exhaust gas inlet and an outlet, a volute connected to the inlet, and a nozzle wall adjacent the volute;
   a turbine wheel carried within the turbine housing and attached to a shaft;
   a plurality of vanes disposed within the turbine housing between the exhaust gas inlet and turbine wheel, each vane comprising:
      an inner airfoil surface oriented adjacent the turbine wheel;
      an outer airfoil surface oriented opposite the inner airfoil surface, the inner and outer airfoil surfaces defining a vane airfoil thickness;
      a leading edge positioned along a first inner and outer airfoil surface junction;
      a trailing edge positioned along a second inner and outer airfoil surface junction; and
      a hole disposed within a first axial vane surface substantially parallel to the nozzle wall for receiving a respective post therein, said post projecting from the nozzle wall towards the turbine wheel;
   wherein the vane has an airfoil thickness that is greater than about 0.16 times a length of the vane as measured between the vane leading and trailing edges to provide a higher area turndown for a fixed amount of vane rotation.

2. The variable geometry turbocharger assembly as recited in claim 1 wherein each vane has an airfoil thickness in the range of from about 0.16 to 0.50 times the length of the vane.

3. The variable geometry turbocharger assembly as recited in claim 1 wherein the inner airfoil surface comprises a convex surface portion and a concave surface portion moving from the vane leading edge to the vane trailing edge.

4. The variable geometry turbocharger assembly as recited in claim 1 wherein the outer airfoil surface comprises a convex surface having a radius of curvature that is less than about 0.8 times the vane length.

5. A variable geometry turbocharger assembly comprising:
   a turbine housing having an exhaust gas inlet and an exhaust outlet, a volute connected to the inlet, and a nozzle wall adjacent the volute;
   a turbine wheel carried within the turbine housing and attached to a shaft;
   a plurality of vanes disposed within the turbine housing between the exhaust gas inlet and turbine wheel, each vane comprising:
      an inner airfoil surface oriented adjacent the turbine wheel;
      an outer airfoil surface oriented opposite the inner airfoil surface, the inner and outer airfoil surfaces defining a vane airfoil thickness;
      a leading edge positioned along a first inner and outer airfoil surface junction;
      a trailing edge positioned along a second inner and outer airfoil surface junction;
      a hole disposed within a first axial vane surface substantially parallel to the nozzle wall for receiving a respective post therein, said post projecting from the nozzle wall towards the turbine wheel; and
      an actuation tab extending from a second axial vane surface opposite from the first vane surface;
   wherein the vane inner airfoil surface comprises a convex surface adjacent the leading edge and a concave surface adjacent the trailing edge, and wherein the vane airfoil thickness is in the range of about 0.16 to 0.50 times the vane length as measured between the leading and trailing edges; and
   means for engaging each vane tab and rotating the vanes in unison within the turbine housing.

6. The variable geometry turbocharger assembly as recited in claim 5 wherein the outer airfoil surface comprises a convex surface having a radius of curvature that is less than about 0.8 times the vane length.

7. The variable geometry turbocharger assembly as recited in claim 6 wherein the outer airfoil surface comprises a convex surface having a radius of curvature that is in the range of from about 0.2 to 0.8 times the vane length.

8. A variable geometry turbocharger assembly comprising:
   a turbine housing having an exhaust gas inlet and an exhaust gas outlet, a volute connected to the inlet, and an integral outer nozzle wall adjacent the volute, the nozzle wall comprising a plurality of posts projecting outwardly therefrom;
   a turbine wheel carried within the turbine housing and attached to a shaft;
   a plurality of vanes pivotably disposed within the turbine housing, each vane comprising:
      an inner airfoil surface positioned adjacent the turbine wheel;
      an outer airfoil surface positioned opposite the inner airfoil surface, the inner and outer airfoil surfaces defining a vane airfoil thickness;
      a leading edge provided along a first inner and outer airfoil surface junction;
      a trailing edge provided along a second inner and outer airfoil surface junction, wherein the airfoil thickness is at least about 0.16 times a length of the vane measured between the leading and trailing edges;
      a hole disposed within an axial vane surface positioned substantially parallel to the integral outer nozzle wall, each vane hole accommodating placement of a respective post therein for providing pivoting vane movement, each vane further comprising an elongated actuation tab extending outwardly from an axial vane surface opposite from the holes;
   an annular unison ring disposed within the turbine housing and positioned axially adjacent the axial vane surface of each vane providing the actuating tabs, the unison ring having a plurality of slots to accommodate a respective vane tab therein, wherein each slot is configured to provide nonrotating sliding movement of a respective tab therein; and
   means for rotating the unison ring within the turbine housing along an axis running through the shaft, wherein rotation of the ring causes the tabs to slide within respective slots and cause the vanes to move radially inwardly or outwardly relative to the shaft, such radial vane movement being facilitated by the pivoting action of each vane about a respective post.

9. The variable geometry turbocharger assembly as recited in claim 8 wherein the inner airfoil surface has a convex surface portion adjacent the leading edge, and a concave surface portion adjacent the trailing edge.

10. The variable geometry turbocharger assembly as recited in claim 9 wherein the outer airfoil surface comprises a convex surface having a radius of curvature that is less than about 0.8 times the vane length.

11. A vane for use in a variable geometry turbocharger, the vane comprising:
   an inner airfoil surface;
   an outer airfoil surface oriented opposite the inner airfoil surface, the inner and outer airfoil surfaces defining a vane airfoil thickness;
   a leading edge positioned along a first inner and outer airfoil surface junction; and
   a trailing edge positioned along a second inner and outer airfoil surface junction;
   wherein the vane has an airfoil thickness that is greater than about 0.16 times a length of the vane as measured between the vane leading and trailing edges to provide a higher area turndown for a fixed amount of vane rotation.

12. The vane as recited in claim 11 wherein each vane has an airfoil thickness in the range of from about 0.16 to 0.50 times the length of the vane.

13. The vane as recited in claim 11 wherein the inner airfoil surface comprises a convex surface portion and a concave surface portion moving from the vane leading edge to the vane trailing edge.

14. The vane as recited in claim 11 wherein the outer airfoil surface comprises a convex surface having a radius of curvature that is less than about 0.8 times the vane length.

15. The vane as recited in claim 11 further comprising a hole disposed within a first axial vane surface substantially parallel to the nozzle wall for receiving a respective post therein.

16. The vane as recited in claim 15 further comprising an actuation tab extending from a second axial vane surface opposite from the hole.

17. A vane for use in a variable geometry turbocharger, the vane comprising:
   an inner airfoil surface;
   an outer airfoil surface oriented opposite the inner airfoil surface, the inner and outer airfoil surfaces defining a vane airfoil thickness;
   a leading edge positioned along a first inner and outer airfoil surface junction;
   a trailing edge positioned along a second inner and outer airfoil surface junction;
   a hole disposed within a first axial vane surface substantially parallel to the nozzle wall for receiving a respective post therein; and
   an actuation tab extending from a second axial vane surface opposite from the hole;
   wherein the vane has an airfoil thickness that is greater than about 0.16 times a length of the vane as measured between the vane leading and trailing edges, and wherein the outer airfoil surface comprises a convex surface having a radius of curvature that is less than about 0.8 times a length of the vane.

* * * * *

(12) INTER PARTES REEXAMINATION CERTIFICATE (0040th)
United States Patent
Arnold

(10) Number: US 6,672,059 C1
(45) Certificate Issued: Nov. 18, 2008

(54) VANE DESIGN FOR USE IN VARIABLE GEOMETRY TURBOCHARGER

(75) Inventor: Steven Don Arnold, Rancho Palos Verdes, CA (US)

(73) Assignee: Honeywell International Inc., Morris Township, Morris County, NJ (US)

Reexamination Request:
No. 95/000,130, Feb. 7, 2006

Reexamination Certificate for:
Patent No.: 6,672,059
Issued: Jan. 6, 2004
Appl. No.: 10/090,864
Filed: Mar. 4, 2002

Related U.S. Application Data

(63) Continuation-in-part of application No. 09/761,277, filed on Jan. 16, 2001, now Pat. No. 6,419,464.
(60) Provisional application No. 60/360,727, filed on Mar. 1, 2002.

(51) Int. Cl.
| | |
|---|---|
| F01D 5/14 | (2006.01) |
| F01D 17/16 | (2006.01) |
| F01D 5/18 | (2006.01) |
| F02C 6/12 | (2006.01) |
| F02D 23/00 | (2006.01) |
| F03B 3/12 | (2006.01) |

(52) U.S. Cl. ................ 60/602; 415/163; 415/164; 416/223 A; 416/223 R
(58) Field of Classification Search .................. None
See application file for complete search history.

(56) References Cited

U.S. PATENT DOCUMENTS

| | | |
|---|---|---|
| 2,392,200 A | 1/1946 | Thompson |
| 2,967,013 A | 1/1961 | Dallenbach et al. |
| 2,976,013 A | 3/1961 | Hunter |
| 3,033,519 A | 5/1962 | Radtke |
| 3,495,921 A | 2/1970 | Swearingen |
| 3,697,193 A | 10/1972 | Phillips |
| 4,242,040 A | 12/1980 | Swearingen |
| 4,300,869 A | 11/1981 | Swearingen |
| 4,459,083 A | 7/1984 | Bingham |
| 4,657,476 A | 4/1987 | Berg |

(Continued)

FOREIGN PATENT DOCUMENTS

| | | |
|---|---|---|
| DE | 224977 | 9/1909 |
| EP | 0 532 907 B1 | 3/1993 |
| EP | 1099838 A1 | 5/2001 |
| JP | 2000-291440 A | 10/2000 |
| JP | 2001-173449 A | 6/2001 |

OTHER PUBLICATIONS

National Advisory Committee for Aeronautics, Report No. 824, "Summary of Airfoil Data," Ira H. Abbott et al. [online], 1945 [retrieved on Jun. 28, 2006]. Retrieved from the Internet: <URL: http://naca.larc.nasa.gov/reports/1945/naca–report–824/naca–report–824.pdf>, 1945, Ira H. Abbott et al.

(Continued)

Primary Examiner—Peter C. English

(57) ABSTRACT

Improved vanes of this invention are constructed for use within a variable geometry turbocharger assembly. Each vane comprises an inner airfoil surface oriented adjacent a turbine wheel, and an outer airfoil surface oriented opposite the inner airfoil surface. The inner and outer airfoil surfaces define a vane airfoil thickness. Each vane includes a leading edge positioned along a first inner and outer airfoil surface junction, a trailing edge positioned along a second inner and outer surface junction, a hole disposed within a first axial vane surface substantially parallel to an outer nozzle wall for receiving a respective post therein, and an actutation tab extending from a second axial vane surface opposite from the first vane surface. A key feature of improved vanes of this invention is that they have an airfoil thickness that is greater than 0.16 times a length of the vane as measured between the vane leading and trailing edges.

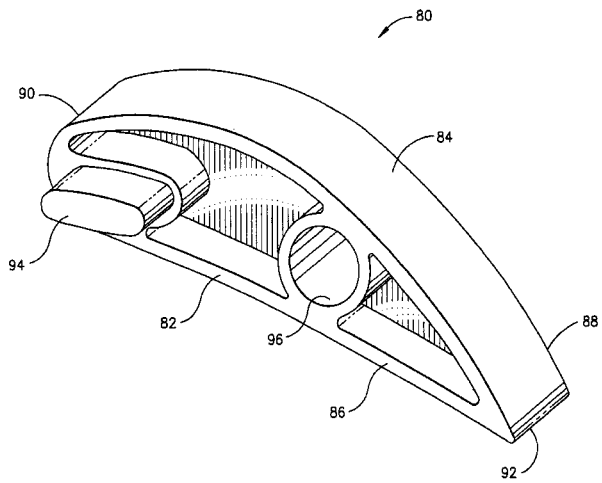

U.S. PATENT DOCUMENTS

| | | | |
|---|---|---|---|
| 4,668,169 | A | 5/1987 | Perry |
| 4,679,984 | A | 7/1987 | Swihart et al. |
| 4,770,603 | A | 9/1988 | Engels et al. |
| 4,804,316 | A | 2/1989 | Fleury |
| 5,017,091 | A | 5/1991 | Tran |
| 5,035,578 | A | 7/1991 | Tran |
| 5,299,909 | A | 4/1994 | Wulf |
| 5,417,548 | A | 5/1995 | Tangler et al. |
| 5,562,420 | A | 10/1996 | Tangler et al. |
| 5,769,602 | A | 6/1998 | Agahi et al. |
| 6,269,642 | B1 | 8/2001 | Arnold et al. |
| 6,503,058 | B1 | 1/2003 | Selig et al. |

OTHER PUBLICATIONS

National Advisory Committee for Aeronautics, Report No. 93, "Aerodynamic Characteristics of Aerofiols," [online], 1921 [retrieved on Jun. 28, 2006]. Retrieved from the Internet: <URL: http://naca.larc.nasa.gov/reports/1921/naca-report-93/naca-report-93.pdf>, 1921, National Advisory Committee for Aeronautics.

"Math Forum—Ask Dr. Math," The Math Forum @ Drexel, [online], Sep. 21, 2001 [retrieved on Jul. 5, 2006]. Retrieved from the Internet: <URL: http://mathforum.org/library/drmath/view/55360.html>, Sep. 21, 2001, The Math Forum, Drexel University.

"Matching of High–Output Turbocharged Engines for Maximum Torque Backup and Emission Reduction Based on the Use of Variable Geometry Compressors and Turbines," National Combined Farm, Construction & Industrial Machinery and Powerplant Meetings, Milwaukee, WI, Sep. 9 to 12, 1974, S.A.E. Pub No. 740738, F.J. Wallace, et al.

"Experimental Anaylsis of Transonic Flow Through the Variable Nozzle of a Radial Inflow Turbine," presented at the International Gas Turbine and Aeroengine Congress and Exposition, Cologne, Germany, Jun. 1 to 4, 1992, A.S.M.E. Pub. No. 92–GT–90, H.E. Gallus et al.

"Aerodynamic Design of Pivotable Nozzle Vanes for Radial–Inflow Turbines," presented at the International Gas Turbine and Aeroengine Congress and Exposition, Cologne, Germany, Jun. 1 to 4, 1992, A.S.M.E. Pub. No. 92–GT–94, M. Schoelch.

"Advanced Variable Geometry Turbocharger for Diesel Engine Application," Article, Society of Automotive Engineers, Inc., vol. 029 (No. 134), Aug. 13, 2001, Steve Arnold et al.

U.S. Appl. No. 09/761,277, filed Mar. 4, 2002, Arnold.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 6–22:

As mentioned above, the first embodiment improved vane 80 of this invention comprises [a] an outer airfoil surface 84 having a relatively small radius of curvature. In an example first embodiment, an improved vane of this invention can have an airfoil outer surface defined by a radius of curvature that is less than about 0.8 times the vane length, eg., from about 0.1 to 0.8 times the vane length. The first embodiment improved vane 80 has an inner airfoil surface 82 that is almost linear in appearance, having a [convex] *concave* surface defined by a relatively large radius of curvature. In an example first embodiment, the improved vane can have an airfoil inner surface defined by a radius of curvature that is greater than about 2 times the vane length. For example, in one embodiment where the vane length is approximately 47 mm, the vane outer surface 84 has a radius of curvature that is approximately 28 mm, and the vane inner surface 82 has a radius of curvature of approximately 207 mm.

Column 8, lines 47–63:

Rather than being defined by a continuous [convex] *concave* arc (i.e., defined by a single radius of curvature), the inner surface 128 has a complex shape that is defined by at least three differently shaped sections. Moving from the leading edge 130, the inner surface has a downwardly canted generally planar section 138 that extends away from the vane leading edge adjacent the tab 134 at an angle of approximately 45 degrees. The canted section 138 extends for less than about ¼ the total distance along the inner surface and is transitioned to a convex section 140. The convex section is defined by a radius of curvature that is generally less than that used to define the arc of the outer surface 126. The convex section 140 extends along the inner surface to about the mid point of the vane and defines a point of maximum airfoil thickness for the vane. *The inner surface 128 has a concave section 142 moving from the convex section 140 to the trailing edge 132.* Thus, the third embodiment vane has [a] *an* airfoil thickness that is greater than both the first and second vane embodiments.

AS A RESULT OF REEXAMINATION, IT HAS BEEN DETERMINED THAT:

Claims 1–17 are cancelled.

\* \* \* \* \*